R. ARNOUX.
ANEMOMETRIC REGULATOR FOR AEROPLANES.
APPLICATION FILED JULY 2, 1913.
1,217,679. Patented Feb. 27, 1917.
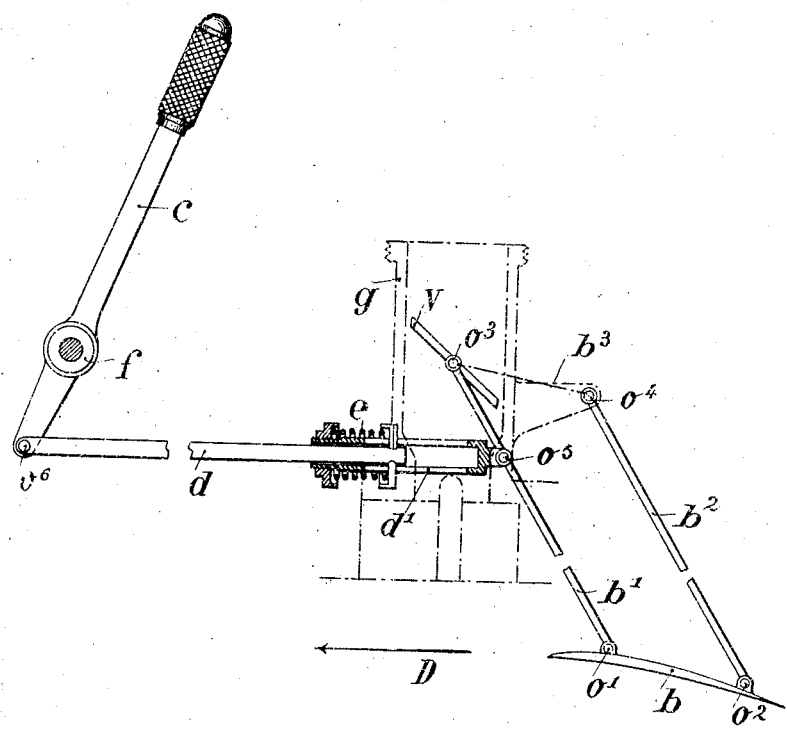
Inventor.
René Arnoux
By B. Singer,
Attorney.

UNITED STATES PATENT OFFICE.

RENÉ ARNOUX, OF PARIS, FRANCE.

ANEMOMETRIC REGULATOR FOR AEROPLANES.

1,217,679.  Specification of Letters Patent.  Patented Feb. 27, 1917.

Application filed July 2, 1913. Serial No. 777,055.

*To all whom it may concern:*

Be it known that I, RENÉ ARNOUX, a citizen of the Republic of France, residing at Paris, France, have invented certain new and useful Improvements in Anemometric Regulators for Aeroplanes, of which the following is a specification.

The object of this invention has been to devise effective means for increasing the stability of aeroplanes in flight. With the foregoing object in view it is contemplated by the invention to employ an anemometric regulator so sensitive to the relative traveling speed of the aeroplane in the atmosphere, and the attacking angle of the supporting planes of the machine as to be simultaneously operable with respect to the latter, means being provided intermediate said regulator and the engine of the aeroplane controlling the admission of the explosive gases into the engine cylinders with the result that the power of the motor is modified. Specifically speaking it is contemplated to utilize the anemometric means aforesaid to vary the propulsive force of the motor in an inverse direction to the sustaining force of the planes.

The drawing represents a diagrammatic view of aeroplane instrumentalities including an anemometric regulator coöperatively associated with means for governing the propulsive force of the engine or motor of a flying machine.

It is known that the supporting or sustaining force incident to the lifting pressure acting on an aeroplane in flight is governed by the equation:

$$P = KS(V^2 \cdot f(i))$$

in which K and S are two constant factors characteristic of the shape and dimensions of its supporting planes, V the relative velocity of the air displacement with respect to the surrounding atmosphere, and finally $f(i)$ a function of their angle of attack or incidence, a function which experience has shown to be always increasing and decreasing with this incidence $i$, at least for all the values of the latter practically employed.

When it is noted that the lifting pressure acting on any aeroplane is a direct result of the propulsive power of its motor screw, and that the action of the eddy currents of the wind striking constantly against the supporting planes as well as the ascending and descending currents produced by the currents of the atmosphere always results in varying not only the angle of incidence $i$, but also the velocity V of the relative wind acting on said planes, it will be immediately evident how important it is to act directly on the propelling power of the motor screw of the aeroplane by an anemometric regulator owing to the fact that since the said regulator is simultaneously sensible to the variations of the two factors V and $i$ of its supporting power, any increase or decrease of one or both of them will be immediately compensated for by a decrease or increase in the propelling power.

The regulation of this power is effected by the anemometric regulator forming the subject matter of the present invention, in the following manner:

$b$ is a small surface similar to the supporting planes of the aeroplane and pivoted to the ends $o^1$ and $o^2$ of the two levers $b^1$ and $b^2$ of a parallelogram, so that this small surface remains constantly parallel to the supporting planes of the apparatus, whatever may be their displacement under the action of the relative wind which strikes against it at every moment. Under these conditions, therefore, this surface is on the one hand constantly attacked at the same angle of incidence as that of the relative wind striking against the principal planes, and on the other hand exposed to resistance to the traveling movement and to the sustaining force which are always proportional to the similar forces to which the planes themselves of the aeroplane are exposed.

In order that the supporting force, acting vertically upward in respect to the path of the aeroplane on the anemometric surface $b$, will be able to exert its regulating action on the motive power, the pivoting points $o^1$ and $o^2$ of this surface or plane to the connecting rods $b^1$ and $b^2$ are situated to the rear of the upper fixed pivoting points $o^3$ and $o^4$ of the said connecting rods.

An antagonistic force, developed by the compression of a coil spring $e$, is opposed to the action of the relative wind on the plane $b$. The spring $e$ is arranged between the ends of two telescopic tubes $d$ and $d^1$. The tube $d^1$ is connected by a pivoting joint $o^6$ to an operating lever $c$ capable of turning on a pivot $f$, which lever the pilot of the aeroplane can stop in any desired position around the pivot by means of a suitable locking device. Under these conditions the lever $c$ permits the aviator to directly control the power of the engine and to stop the whole anemometric system in the different positions corresponding to the ascending of the aeroplane, its horizontal forward movement, or its descending movement, without in any one of these different positions the anemometric device ceasing to exert its regulating action.

In the accompanying drawing the arrow D indicates the direction along which the plane $b$, that is to say the aeroplane, is moved.

The anemometric regulator is connected either directly, as indicated in the drawing, or indirectly to the valve $v$ of the carbureter $g$ regulating the quantity of explosive gases drawn in by the engine, in such a way that any increase or decrease of the relative wind constantly striking against the anemometric plane $b$ corresponds relatively to a decrease of the increase of the power of the engine and consequently of the propelling power of the screw operated thereby.

The axis $o^3$ is fixed relatively to the points $o^1$ and $o^2$ which are displaced with the plane $b$. It is noted that the axis $o^3$ can turn around itself, however, in order to insure the displacement of the valve $v$. Relative to the joint connection $o^5$ it should be borne in mind that the same is adapted to slide upon the rod $b^1$; otherwise no functioning of the device would take place. The showing on the drawing is entirely diagrammatic, however.

Having thus described the invention, what is claimed is:

1. In a device for maintaining the sustaining force of aeroplanes substantially constant, the combination of anemometric means adapted to be displaced by the effect of the variations of the sustaining force acting thereon, a motor for propelling the aeroplane, and means intermediate said anemometric means and the motor for varying the propulsive force of said motor in an inverse ratio to the sustaining force.

2. In a device for maintaining the sustaining force of aeroplanes substantially constant, the combination of anemometric means adapted to be displaced by the effect of the variations of the sustaining force acting thereon, a motor for propelling the aeroplane, and means intermediate the motor and the anemometric means for modifying the power of the motor as an incident to the effect of the variations of the sustaining force acting upon the anemometric means.

3. In a device for maintaining the sustaining force of aeroplanes substantially constant, the combination of anemometric means adapted to be displaced by the effect of the variations of the sustaining force acting thereon, a motor for propelling the aeroplane, valve means controlling the admission of an explosive medium to the motor, and means intermediate the anemometric means and said valve means for acting on the latter to effect a variation in the power of the motor in correspondence with the effect of variations of the sustaining force acting upon said anemometric means.

4. In a device for maintaining the sustaining force of aeroplanes substantially constant, the combination of anemometric means adapted to be displaced by the effect of the variations of the sustaining force acting thereon, a motor for propelling the aeroplane, valve means controlling the admission of an explosive medium to the motor, means intermediate the anemometric means and said valve means for acting on the latter to effect a variation in the propulsive force of the motor in an inverse ratio to the variation in the sustaining force of the anemometric means, and a lever common to said valve means and to the anemometric means.

5. In an air craft, propelling means for the air craft, an adjustable power controller therefor whereby the power supplied through said propelling means may be varied, and a pressure responsive device connected to adjust said power controlling means to vary the propelling power in response to variations in wind pressure.

6. In a device for maintaining the sustaining force of aeroplanes substantially constant, the combination of anemometric means adapted to be displaced by the effect of the variations of the air pressure acting thereon, a motor for propelling the aeroplane, and means intermediate said anemometric means and the motor for varying the propulsive force of said motor in an inverse ratio to the air pressure.

7. In a device for maintaining the sustaining force of aeroplanes substantially constant, the combination of anemometric means adapted to be displaced by the effect of the variations of the air pressure acting thereon, a motor for propelling the aeroplane, and means intermediate the motor and the anemometric means for modifying the power of the motor as an incident to the effect of the variations of the air pressure acting upon the anemometric means.

8. In a device for maintaining the sustaining force of aeroplanes substantially constant, the combination of anemometric means adapted to be displaced by the effect of the variations of the air pressure acting thereon, a motor for propelling the aeroplane, valve means controlling the admission of an explosive medium to the motor, and means intermediate the anemometric means and said valve means for acting on the latter to effect a variation in the power of the motor in correspondence with the effect of variations of the air pressure acting upon said anemometric means.

9. In a device for maintaining the sustaining force of aeroplanes substantially constant, the combination of anemometric means adapted to be displaced by the effect of the variations of the air pressure acting thereon, a motor for propelling the aeroplane, valve means controlling the admission of an explosive medium to the motor, means intermediate the anemometric means and said valve means for acting on the latter to effect a variation in the propulsive force of the motor in an inverse ratio to the variation in the air pressure of the anemometric means, and a lever common to said valve means and to the anemometric means.

10. In an aeroplane, means for maintaining the sustaining force of the aeroplane substantially constant comprising propelling means for the aeroplane, anemometric means, and means connecting the propelling means and the anemometric means and operative to vary the propulsive force of the propelling means in inverse ratio to the air pressure acting on the anemometric means.

11. In an aeroplane having a sustaining surface and propelling means, an anemometric plane having means for maintaining it in substantial parallelism with the sustaining surface but movable relatively thereto under the pressure of wind acting thereon, and means operative by said anemometric plane for controlling the propulsive force of the propelling means as determined by the air pressure acting on said anemometric plane.

12. In an aeroplane having a sustaining surface and propelling means, an anemometric surface having means for maintaining it constantly in parallelism with the sustaining surface, said anemometric surface being subject to the influence of air pressure tending to move it in one direction and also subject to the influence of counterbalancing means tending to move it in an opposite direction, and means operative by said anemometric surface for varying the propulsive force of the propelling means as determined by the air pressure acting on said anemometric surface.

13. In an aeroplane having a sustaining surface and propelling means, an anemometric surface movable in one direction under the influence of air pressure acting thereon and having means acting to balance the effect of the air pressure on said anemometric surface, and means controlled by the anemometric surface for varying the propulsive force of the propelling means in inverse ratio to the air pressure acting on said anemometric surface.

14. In an aeroplane having a sustaining surface and propelling means, anemometric means movable under the influence of air pressure acting thereon and having means counteracting the influence of such air pressure thereon, means controlled by said anemometric means for varying the propulsive force of the propelling means as determined by the air pressure acting on said anemometric means, and means for modifying the force of said counteracting means.

15. In an aeroplane having a sustaining surface and propelling means, anemometric means movable under the influence of air pressure, a spring opposing such movement of the anemometric means, means controlled by said anemometric means for varying the propulsive force of the propelling means in inverse ratio to the air pressure acting thereon, and manual control means for modifying the force of said spring.

In testimony whereof I affix my signature in presence of two witnesses.

RENÉ ARNOUX.

Witnesses:
 GEORGES RIGOT,
 LUCIEN MEMMINGER.